United States Patent [19]

Brown et al.

[11] Patent Number: 5,082,887

[45] Date of Patent: * Jan. 21, 1992

[54] AGGREGATED COMPOSITE MINERAL PIGMENTS

[75] Inventors: Alan J. Brown, Milledgeville; Dickey S. Shurling, Jr., Sandersville; Jenny S. Carswell, Milledgeville, all of Ga.

[73] Assignee: ECC American Inc., Atlanta, Ga.

[*] Notice: The portion of the term of this patent subsequent to Nov. 26, 2008 has been disclaimed.

[21] Appl. No.: 609,790

[22] Filed: Nov. 7, 1990

Related U.S. Application Data

[63] Continuation-in-part of Ser. No. 459,093, Dec. 29, 1989.

[51] Int. Cl.$^5$ .............................................. C08J 3/14
[52] U.S. Cl. ..................... 524/413; 524/425; 524/447
[58] Field of Search ...................... 524/425, 447, 413

[56] References Cited

U.S. PATENT DOCUMENTS

| | | |
|---|---|---|
| 3,014,836 | 12/1961 | Proctor, Jr. |
| 3,586,523 | 6/1971 | Fanselow et al. |
| 4,028,173 | 6/1977 | Olson |
| 4,072,537 | 2/1978 | Kurrle |
| 4,346,178 | 8/1982 | Economou |
| 4,381,948 | 5/1983 | McConnell et al. |
| 4,775,420 | 10/1988 | Gonnet et al. .................. 524/431 |
| 4,816,074 | 3/1989 | Raythatha et al. |
| 4,820,554 | 4/1989 | Jones et al. |

Primary Examiner—Joseph L. Schofer
Assistant Examiner—Jeffrey T. Smith
Attorney, Agent, or Firm—Klauber & Jackson

[57] ABSTRACT

A process for forming chemically aggregated composite porous bulking pigments for use in paper filling and coating formulations. An aqueous slurry is formed of feed mineral particles selected from one or more members of the group consisting of kaolin, calcium carbonate, titanium dioxide, gypsum, and mica. A high molecular weight carboxyl-containing polymer or copolymer is added to the slurry to flocculate the mineral particles. An excess of calcium ion is added to the flocced slurry to precipitate the calcium salt of the carboxyl-containing polymer in situ on the feed mineral flocs, and thereby form aggregates of feed mineral particles interconnected by the calcium salt and having a bulk, porous, floc structure. Gaseous carbon dioxide is added to the slurry, and reacts with remaining calcium ion to precipitate calcium carbonate onto the polymeric carboxyl calcium salt. This forms additional light scattering voids or pores and strengthens the connections among the flocced feed particles. The resultant composite aggregates are recovered and dried, as product. The composite aggregate products are also disclosed and claimed.

14 Claims, 4 Drawing Sheets

AGGREGATED COMPOSITE MINERAL PIGMENTS

RELATED APPLICATION

This application is a continuation-in-part of application Ser. No. 459,093, filed Dec. 29, 1989, and entitled "Chemically Aggregated Mineral Pigments".

FIELD OF THE INVENTION

This invention relates generally to mineral products, and more specifically relates to a structured mineral pigment, especially a composite mineral and carbonate pigment, such as a kaolin/carbonate pigment, and methods of manufacture of same. The composite pigment displays high pore volume, is useful as a filler in paper products, and also enables preparation of paper coating formulations which yield resultant coated paper products of surprisingly enhanced properties.

BACKGROUND OF THE INVENTION

In the course of manufacturing paper and similar products, including paperboard and the like, it is well known to incorporate quantities of inorganic materials into the fibrous web in order to improve the quality of the resulting product. In the absence of such "fillers" the resulting paper can have a relatively poor texture due to discontinuities in the fibrous web. The said fillers are also important in improving the printing qualities of the paper, i.e. by improving the surface characteristics of same. The use of appropriate such fillers, further, vastly improves the opacity and the brightness of a paper sheet of a given weight A number of inorganic materials have long been known to be effective for many of the aforementioned purposes. Among the best of these materials is titanium dioxide, which can be incorporated into the paper in the form of anatase or of rutile. Titanium dioxide, however, is among the most expensive materials which are so useable. Thus despite the effectiveness of such material as a filler, its use is limited and satisfactory replacements have been much sought after.

Among the materials which have found increasing acceptance as paper fillers are calcined kaolins. Materials of this type are generally prepared by calcining a crude kaolin which may have been initially subjected to prior beneficiation steps in order to remove certain impurities, e.g. for the purpose of improving brightness in the ultimate product. Reference may usefully be had to Proctor, U.S. Pat. No. 3,014,836, and to Fanselow et al, U.S. Pat. No. 3,586,823, which disclosures are representative of the prior art pertinent to calcined kaolins.

Those properties which render a kaolin pigment particularly valuable for use as a filler are also well known. These include a low abrasion value, and high brightness and opacifying characteristics. The low abrasion is significant in order to assure that the resultant paper product may be manufactured and processed using conventional machinery without damaging same. The brightness and opacifying characteristics are important in producing an acceptable paper sheet, one which incorporates whiteness, high opacity, good printability, and light weight.

Both the brightness characteristics of the given kaolin and the opacifying properties of same when incorporated as a filler in paper, may be quantitatively related to a property of the filler identified as the "scattering coefficient S". The said parameter, i.e. the scattering coefficient S of a given filler pigment, is a property well known and extensively utilized in the paper technology art, and has been the subject of numerous technical papers and the like. The early exposition of such measurements was made by Kubelka and Munk, and is reported in Z. Tech. Physik 12:539(1931). Further citations to the applicable measurement techniques and detailed definitions of the said scattering coefficient are set forth at numerous places in the patent and technical literature. Reference may usefully be had in this connection, e.g. to U.S. Pat. Nos. 4,026,726 and 4,028,173. In addition to the citations set forth in these patents, reference may further be had to Pulp and Paper Science Technology, Vol. 2 "Paper", Chapter 3, by H. C. Schwalbe (McGraw-Hill Book Company, N.Y.).

In order to obtain high light scattering and opacity the major portion of filler should be in the range of one micrometer. However, good light scatter cannot be achieved solely by using a kaolin having the said size characteristics: an essential further characteristic needed is that the kaolin be structured, i.e. formed from an assemblage of platelets interconnected or bonded to provide aggregates which include a network of the platelets. This creates high numbers of internal voids or pores, which function as light scattering centers.

Aggregation can be of interest for additional reasons. In particular, many kaolin crude reserves are considerably finer than preferred by the paper industry; i.e. they have an unduly high proportion of particles with E.S.D.'s below 0.25 micrometers. Typical Cretaceous kaolins, e.g. include 25 to 30% by weight of particles below 0.25 micrometers; and typical Tertiary kaolins can include 50 to 60% by weight of particles below 0.25 micrometers E.S.D. (equivalent spherical diameter).

One method for achieving aggregation is to utilize calcining. Thus, in U.S. Pat. No. 4,381,948 to A. D. McConnell et al. a calcined kaolin pigment and a method for manufacture of same are disclosed. The said pigment consists of porous aggregates of kaolin platelets, and exhibits exceptionally high light scattering characteristics when incorporated as a filler in paper. This pigment, which substantially corresponds to the commercially available product ALPHATEX ® of the present assignee, E.C.C. America, Inc. (Atlanta, Ga.), is prepared by first blunging and dispersing an appropriate crude kaolin to form an aqueous dispersion of same. The blunged and dispersed aqueous slurry is subjected to a particle size separation from which there is recovered a slurry of the clay which includes a very fine particle size: e.g., substantially all particles can be smaller than 1 micrometer E.S.D. The slurry is dried to produce a relatively moisture-free clay, which is then thoroughly pulverized to break up agglomerates. This material is then used as a feed to a calciner; such feed is calcined under carefully controlled conditions to typical temperatures of at least 900° C. The resulting product is cooled and pulverized to provide a pigment of the porous, high light scattering aggregates of kaolin platelets as described.

Calcined kaolins have also found use in paper coating applications. Reference may be had to the paper by Hollingsworth, Jones, and Bonney, "The Effect of Calcined Clays on the Printability of Coated Rotogravure and Offset Printing Papers", TAPPI Proceedings, pages 9-16, 1983 Coating Conference, discussing the advantages of incorporating small quantities of calcined kaolins into conventional kaolin-based coating formulations. Brightness and opacity of the paper both increase with increased calcined kaolin content, as may be expected from a pigment with high light scatter, and in some formulations gloss may show a slight increase with increasing calcined kaolin content.

Calcined kaolin products, including those of the aforementioned ALPHATEX ® type, are seen to be manufactured by relatively complex techniques involving a multiplicity of steps, including specifically a calcining step, plus various preparatory steps and post-calcining steps. Thus, the said product is relatively expensive to produce; and requires considerable investment in complex apparatus and the like—e.g. e.g. highly regulated calciners, etc. It can indeed be noted that the conditions of preparation of these materials must be very carefully controlled in order to keep abrasion acceptably low in the calcined product. For example, the calcination operation tends per se to produce an abrasive product—in consequence of overheating—if great care is not taken to preclude such a result.

It is further to be noted that in order to produce a low abrasion calcined product, the particle size in the feed to the calciner must be carefully controlled—even a relatively small increase in coarseness of such feed can have very marked detrimental effect on abrasion characteristics.

It has heretofore been known to utilize uncalcined (sometimes referred to as "hydrous") kaolin both as paper fillers and for paper coating. Because the uncalcined material usually does not possess high light scattering qualities or good opacity, its usefulness, especially as a filler, is limited; and this (in addition to improving brightness) is indeed the particular advantage of calcined products of the ALPHATEX ® type; i.e. by virtue of the aggregated structures of same, high light scattering properties are provided and good opacity.

With respect further to terminology, it is noted that the prior art literature, including numerous of the prior art patents relating to the field of kaolin products and processing, often uses the term "hydrous" to refer to a kaolin which has not been subjected to calcination—more specifically, which has not been subjected to temperatures above about 450° C., which temperatures serve to alter the basic crystal structure of kaolin. These so-called "hydrous" clays may have been produced from crude kaolins, which have been subjected to beneficiation, as, for example, to froth flotation, to magnetic separation, to mechanical delamination, grinding or similar comminution, but not to the mentioned heating as would impair the crystal structure.

In an accurate technical sense, the description of these materials as "hydrous" is, however, incorrect. More specifically, there is no molecular water actually present in the kaolinite structure. Thus, although the composition can be (and often is) arbitrarily written in the form $2H_2O.Al_2O_3.2SiO_2$, it is now well-known that kaolinite is an aluminum hydroxide silicate of approximate composition $Al_2(OH)_4Si_2O_5$ (which equates to the hydrated formula just cited). Once the kaolin is subjected to calcination, which, for the purposes of this specification means being subjected to heating of 450 C. or higher for a period which eliminates the hydroxyl groups, the crystalline structure of the kaolinite is destroyed. Therefore, such material, having been thus calcined, cannot correctly be referred to as a "kaolin". Accordingly, it should be appreciated that henceforth in this specification, when the term "kaolin" or "kaolinite" is utilized, such term necessarily implies that the original structure of the material is intact Thus, the term "kaolin" as used herein, can be considered to be equivalent to the technically inaccurate (but oft-occurring) prior art usage, "hydrous kaolin" or sometimes simply "hydrous clay."

From time to time it has been proposed to provide structured kaolin agglomerates by methods unrelated to calcining, the objective being to produce a high light scattering pigment, one with good opacifying properties, without the need for calcination.

Thus, in U.S. Pat. No. 4,346,178 to Peter Economou, a structured kaolin agglomerate is disclosed wherein the clay platelets are stabilized or frozen in position by the addition thereto of a urea-formaldehyde prepolymer.

Further relevant art includes U.S. Pat. No. 4,072,537 to F. L. Kurrle. Disclosed therein is a composite silicate pigment prepared by a precipitation reaction employing an aqueous suspension of clay particles wherein spherical hydrous metal silicate particles are precipitated on the planar surfaces of clay particles having a platelet-type structure. The metal silicate pigment component is comprised of the reaction product of a water soluble alkali metal silicate such as sodium silicate and water soluble salt of a polyvalent metal, such as calcium chloride.

As disclosed in U.S. Pat. No. 4,820,554 to J. P. E. Jones et al, a fine particle size kaolin feed is reacted in particulate form with a metal chloride, such as silicon tetrachloride, to form a chemically aggregated structured kaolin pigment. Thus, the aggregation of fine kaolinite is caused to occur when treated with silicon tetrachloride. These micron size, bulky aggregates are used to improve the surface properties of coated paper and the opacity of filled paper.

In Ravthatha et al, U.S. Pat. No. 4,816,074, a process is described in which a structured aggregated kaolin pigment is prepared by mixing substantially dry kaolin in particulate form with an aqueous alkali metal silicate to deposit on the surface of the kaolin particles a substantially molecular level of said silicate without formation of silica gel, drying the treated kaolin without calcination and exposing it to an acidic gas. The product is useful as a pigment in the coating or filling of paper. In a further aspect of the invention, it is preferable to intermix with the kaolin feed, small quantities of an aggregation enhancing agent. Such agent is selected from one or more members of the group consisting of the alkaline earth metal carbonates, chlorides or hydroxides, or lithium carbonate.

Polyacrylate alkali metal salts are known as dispersants for clays, e.g., kaolin. Sodium polyacrylate is a common dispersant, frequently used in the refining-/working up of the crude material However, polyacrylate salts have not been disclosed as useful in the aggregation of clay particles.

U.S. Pat. No. 4,775,420 assigned to Coatex, S. A., describes a pigment composition for the coating of paper comprising a dispersion of an aqueous phase, a pigment or mixture of pigments such as kaolin, titanium oxide and calcium carbonate, and a dispersing agent comprised of carboxyl-containing polymers, e.g., an acrylic polymer, at least 60% of which is converted to the salt form with a polyvalent cation and if desired the balance may be converted with a monovalent cation such as sodium, ammonium and quaternary amine cations. Typically the dispersing agent is a calcium/sodium polyacrylate, see Test 34, column 12, lines 58–62. There is no teaching of aggregation of particulates.

Japanese Kokai Patent No. SHO 57(1982)-184430 discloses a high-concentration, low-viscosity aqueous dispersion of calcium carbonate comprising carbonates of different particle size range, a polycarboxylic acid type polymer such as an acrylic acid polymer and an inorganic electrolyte. A binder may be present such as starch. The electrolyte is selected from the group consisting of the hydroxides, chlorides, sulfates and phosphates of calcium, zinc and magnesium. The inventors found that if two kinds of microscopic calcium carbonate particles with specific and uniform particle sizes and shapes and with sizes different from each other but with a specific relationship, were blended in a specific proportion and compounded with constant amounts of a certain kind of dispersant and inorganic electrolyte, the packing density of the calcium carbonate particles was increased, and it was possible to provide a high concentration, low viscosity aqueous dispersion thereof.

In accordance with the foregoing, it may be regarded as an object of the present invention, to provide a structured composite pigment product, such as a composite kaolin/calcium carbonate pigment which possesses improved light scattering characteristics, and hence is useful as an opacifier and light scattering filler for paper and paper products, and which may similarly be used in other paper manufacturing applications, including in the coating of same.

It is a further object of the present invention, to provide a pigment product of the foregoing character, which is prepared without calcination and therefore without subjecting the kaolin to high temperatures, and which accordingly possesses low abrasiveness in accordance with the kaolin feed from which it is produced.

It is a yet further object of the invention, to provide a pigmentary product of the foregoing character, which is composed of structured aggregates of minute kaolin or other mineral particles which are bonded together chemically, i.e. without the use of calcination or other high temperature techniques, and which includes high quantities of in situ precipitated calcium carbonate.

It is a still further object of the invention to provide a high light scattering pigmentary kaolin/calcium carbonate product, which may be produced at lower costs than calcined kaolins, and which can therefore provide a lower cost replacement for many applications in which calcined kaolin products or other high cost fillers are presently utilized.

It is a yet further object of the invention, to provide a process for producing a pigmentary high light scattering kaolin/calcium carbonate product, which process utilizes chemical aggregation techniques, and may be carried out without the use of a calcining step or of other high temperature processing conditions or equipment.

It is a yet further object of the present invention, to provide a process for producing structured composite mineral pigments as aforementioned, which consists of a minimal number of simply conducted steps, which utilize relatively simple and inexpensive apparatus.

A yet further object of the invention, is to provide a process as aforementioned, which enables low abrasion structured kaolin/carbonate pigments to be produced from coarser process feeds than can normally be employed in calcination to produce a product of comparable low abrasion.

It is a further object of the invention to provide bulky structured kaolin/carbonate pigments which are eminently suitable for paper coating applications.

Another object of the invention is to produce aggregated, bulked pigments which have increased pore radius and pore volume as compared with the feed material. It is known that the pores of a pigment contribute to light scatter in paper treating formulations.

In the aforementioned copending application Ser. No. 459,093, chemically aggregated bulking pigments are produced through the cross-linking of anionic polymers with multi-valent cations on a clay surface, forming insoluble, cross-linked polymers. The anionic polymers used may have an average molecular weight range of from 5K to 1M, where K = thousand and M = million; the multi-valent cations will typically comprise $Ca^{2+}$, $Al^{3+}$, $Cr^{2+}$, etc. This procedure increases the light scatter of these pigments in paper coating formulations by creating aggregates of increased average pore radius and volume in comparison to the feed particles. The process is surface non-specific, and can be used to aggregate and bulk any negatively charged mineral particles which have acid to neutral pH characteristics, including e.g. kaolins, calcium carbonates (ground or chemically precipitated), $TiO_2$, and combinations of these.

According to one aspect of said U.S. application 459,093, a clay such as kaolin is slurried in water and a source of a polyvalent metal, such as $CaCl_2$, is added which flocs the clay in the slurry. Polyacrylic acid (HPAC) is added to an acidic pH preferably in the range of about 3 to 5 and the pH is gradually raised to an alkaline pH preferably in the range of about 8–9.5. At the acid pH both the cation and the polyacrylic acid are soluble in the clay/water slurry. Upon increasing the pH, the HPAC cross-links with the polyvalent cations which causes the polyacrylate, e.g., calcium polyacrylate (CaPAC) to precipitate in situ on the clay floc that has been formed; the calcium polyacrylate stabilizes the clay floc, acting as a "glue" to preserve the bulked, porous floc structure, whereby the pore volume and radius of the treated clay are increased.

Variations of the above method may be employed For example, since particulate calcium carbonate is often used together with kaolin to increase brightness, combinations of for example up to 75 weight % (and more preferably up to about 50 weight %) calcium carbonate of the total mixture may be employed without sacrificing the advantages of the invention. This pigment is useful as a filler in paper making. Pre-removal of fines from the kaolin feed increases the effectiveness of the CaPAC glue and further increases light scatter. This pigment has application as a filler or a coating pigment.

Thus, in accordance with Ser. No. 459,093, calcium polyacrylates have been successfully cross-linked (precipitated) on kaolin surfaces to produce pigments with increased pore volume and light scatter. Results indicate that a pigment with an approximately 600 normalized scattering coefficient can be produced from a kaolin feed treated with 50 lbs/ton of CaPAC. Similar results were obtained with calcium carbonate/kaolin mixtures. Treatment of these materials with 75 to 100 lbs./ton CaPAC produced pigments with pore volumes similar to commercially available calcined kaolin pigments, but with Breunig abrasions similar to hydrous kaolins.

SUMMARY OF INVENTION

Now in accordance with the present invention, a process is provided for forming further chemically aggregated high pore volume composite bulking pigments, for use in paper filling and coating formulations. Pursuant to such process, an aqueous slurry is formed at 10 to 30% solids, of a feed material comprising mineral particles selected from one or more members of the group consisting of kaolin, calcium carbonate, titanium dioxide, gypsum, and mica. A high molecular weight carboxyl-containing polymer or copolymer is then added to the slurry to flocculate the feed mineral particles. Thereupon an excess of calcium ion is added to the flocced slurry to precipitate the calcium salt of the carboxyl-containing polymer in situ on the mineral flocs, and thereby form aggregates of mineral particles interconnected by the calcium salt, and having a bulk, porous, floc structure. Gaseous carbon dioxide is then added to the slurry, which reacts with the remaining calcium ion in the slurry to precipitate calcium carbonate onto the polymeric carboxyl calcium salt. This forms additional light scattering voids and pores (i.e. beyond those already generated from the floccing and depositing of the calcium salt of the carboxyl-containing polymer), and strengthens the connections among the flocced particles of the mineral. The resultant composite aggregates are recovered and dried, as product.

The carboxyl-containing polymer or copolymer is preferably a polyacrylic acid, polymethacrylic acid, or a copolymer of polyacrylic acid or polymethacrylic acid with one or more acrylic monomers. Where the carboxyl-containing compound is polyacrylic acid, it preferably has a molecular weight of from 60,000 to 1,000,000, and is added to the slurry as from about 25 to 150 lbs/ton of the dry mineral.

The calcium ion is preferably added to the slurry as calcium hydroxide, at an addition level to provide a pH of from about 11 to 12 in the slurry.

The invention thus provides a chemically aggregated composite bulking pigment having high pore volume, for use in paper filling and coating formulations, comprising flocced assemblages of discrete mineral particles. The feed mineral particles can comprise kaolin, calcium carbonate, titanium dioxide, gypsum, mica, the assemblages can comprise combinations of these minerals, e.g. kaolin particles together with titanium dioxide particles. The feed mineral particles are fixedly interconnected through a network defined by a calcium salt of a high molecular weight carboxyl-containing polymer or copolymer, which has been precipitated in situ at the flocced assemblage. The assemblage is overdeposited with calcium carbonate particles precipitated in situ upon the calcium salt. The precipitated carbonate defines additional light scattering voids or pores at the aggregates and strengthens the calcium salt interconnections among the flocced particles. In a typical such product, the feed mineral may comprise kaolin and the calcium salt is calcium polyacrylate, with the precipitated calcium carbonate comprising from 10 to 60% by weight of the aggregated product. Such aggregates will typically display a pore volume in the range of 0.50 to 1.10 cm$^3$/g.

In a preferred embodiment of the process of the invention, an aqueous 10 to 30% solids slurry of a particulate feed kaolin is mixed with a high molecular weight polyacrylic acid to flocculate the kaolin particles. An excess of calcium hydroxide is then added to the flocced slurry to bring the pH to about basic and precipitate calcium polyacrylate in situ on the kaolin flocs, and thereby form aggregates of kaolin particles interconnected with calcium polyacrylate and having a bulk, porous, floc structure. The suspension is then treated with carbon dioxide, which reacts with the excess calcium ion, thereby precipitating calcium carbonate onto the calcium polyacrylate, to strengthen the connections between the kaolin particles, and form additional light-scattering voids or pores. The composite aggregates are recovered and dried as product. The polyacrylic acid used in preparing the kaolin/carbonate product may have a molecular weight in the range of from about 60,000 to 1,000,000, and is added as from about 25 to 150 lbs/ton of dry kaolin. More preferably the polyacrylic acid is 10% maleic anhydride modified, has a molecular weight in the range of from 35,000 to 65,000, and is added as 0.2 to 0.3% by weight of dry kaolin. The recovery and drying step can be effected by filtering the reaction slurry from the carbonation step, and redispersing and spray drying the filtered material. The proportions of kaolin, calcium hydroxide and carbon dioxide are such that the composite product includes from 10 to 60% by weight, of calcium carbonate.

DETAILED DESCRIPTION

The invention is further illustrated by the following Examples, which are, however, to be considered illustrative and not delimitive of the invention otherwise set forth:

EXAMPLE 1

Figure 1:
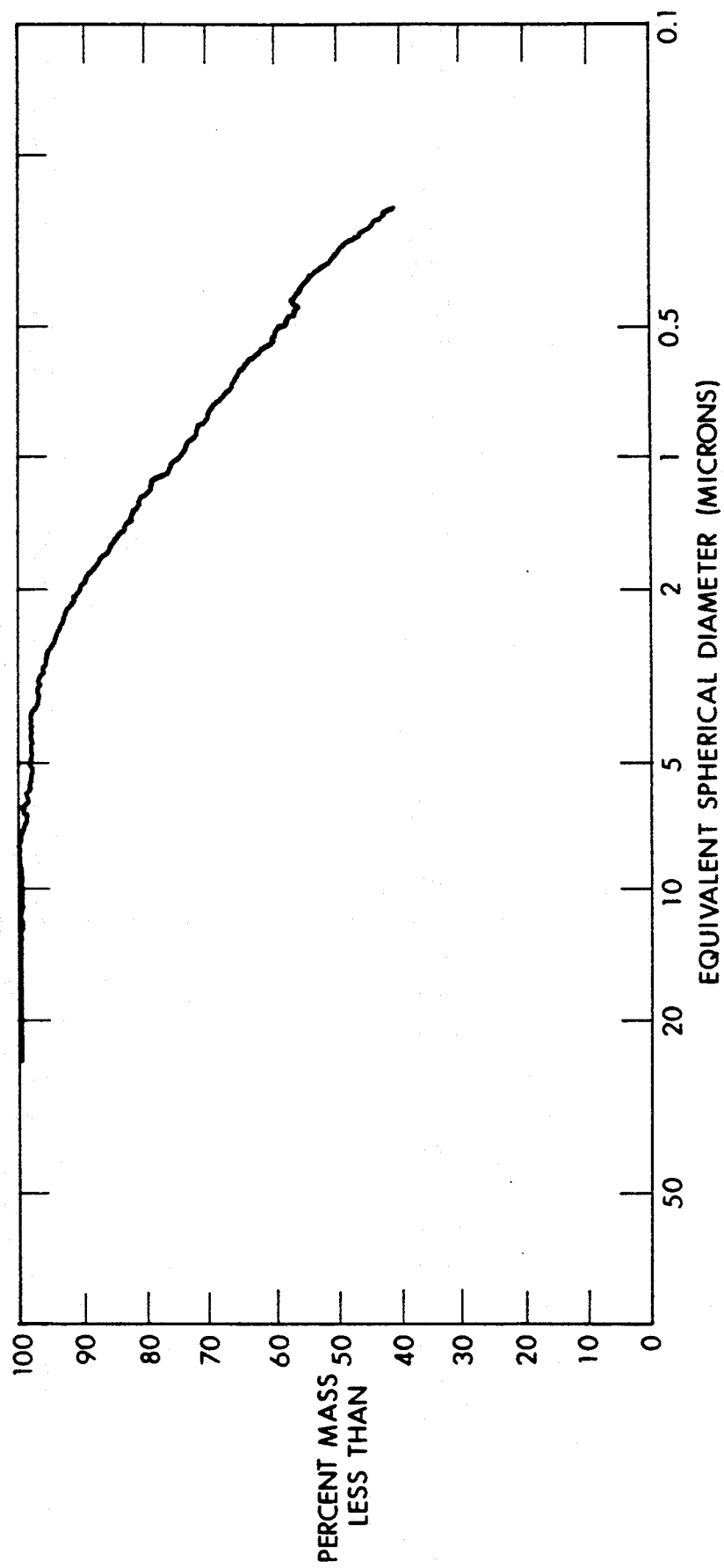
FIG. 1, is a particle size distribution (P.S.D.) curve for a feed kaolin prior to processing in accordance with the present invention.
Figure 2:
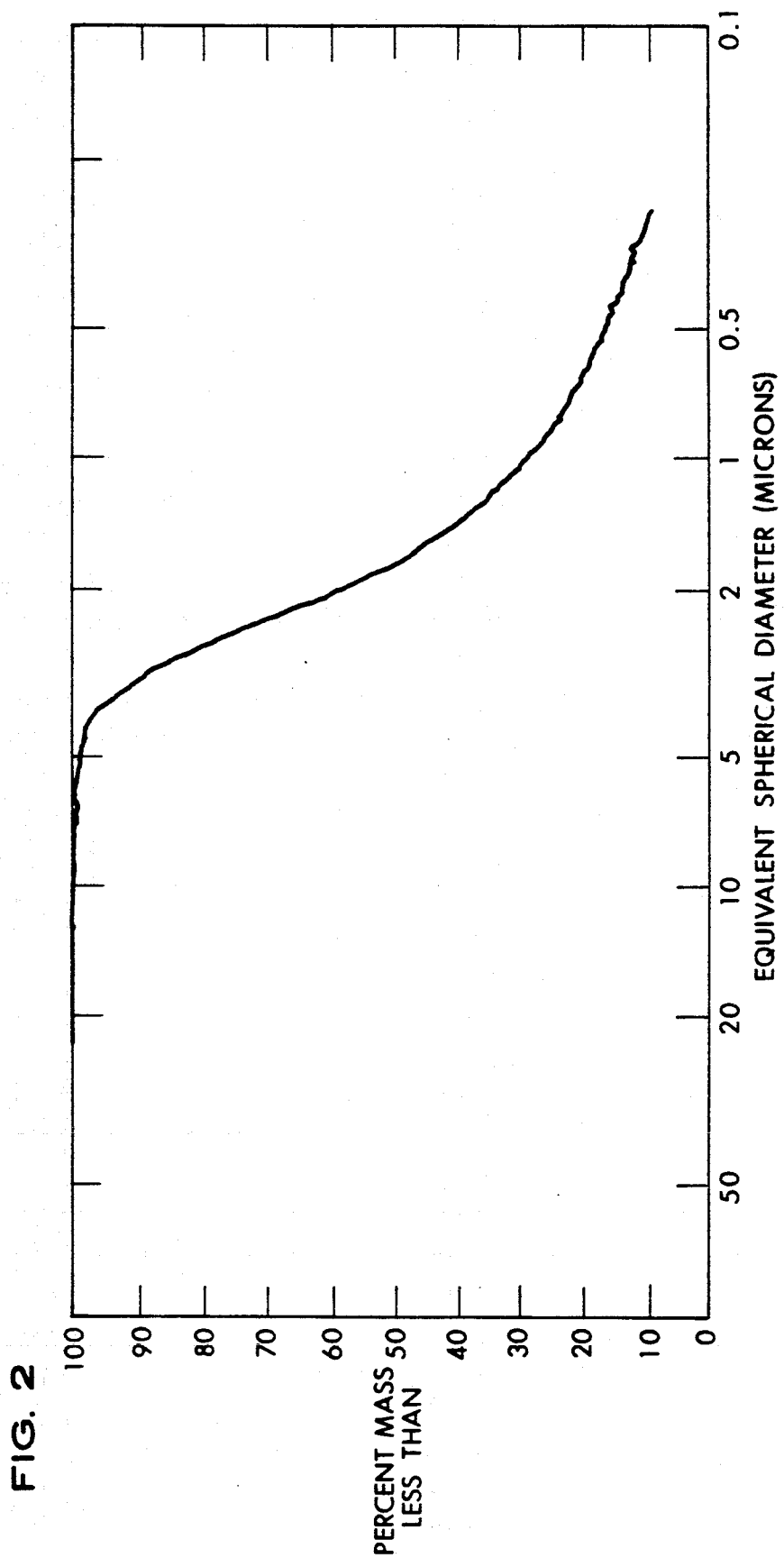
FIG. 2, is a further P.S.D. curve, for the product resulting from aggregation of the feed material referenced in FIG. 1.

To a 20% solids slurry of kaolin having a P.S.D. (by weight), such that 91% are below 2 μm, 75% below 1 μm, 60% below 0.5 μm, and 39% below ¼ μm, was added with stirring 50 pounds per ton (of dry kaolin) of polyacrylic acid (60,000 MW). The mixture was stirred with a laboratory stirrer for 30 minutes. To this mixture, 1550 pounds per ton (of dry kaolin) of Ca(OH)$_2$ was added. The mixture was stirred for 5 minutes. Gaseous CO$_2$ was then bubbled through the slurry until the pH of the slurry was 6.5. The slurry was filtered and the product dried in a Büchi lab mini-spray drier at 200° C. inlet and 100° C. outlet. The dried product had a pore volume of 1.02 cm$^3$/g which is an increase of 0.62 cm$^3$/g over the starting kaolin material (~0.4 cm$^3$/g). G.E. Brightness (measured by TAPPI procedure T-646-os-75) increased by 5.8 brightness points from 73.8 to 79.6, and the average particle size changed from 0.35 μm to 1.75 μm with aggregation. The particle size distribution curves for the kaolin feed material and the aggregated material are given in FIGS. 1 and 2, respectively.

EXAMPLE 2

Figure 3:
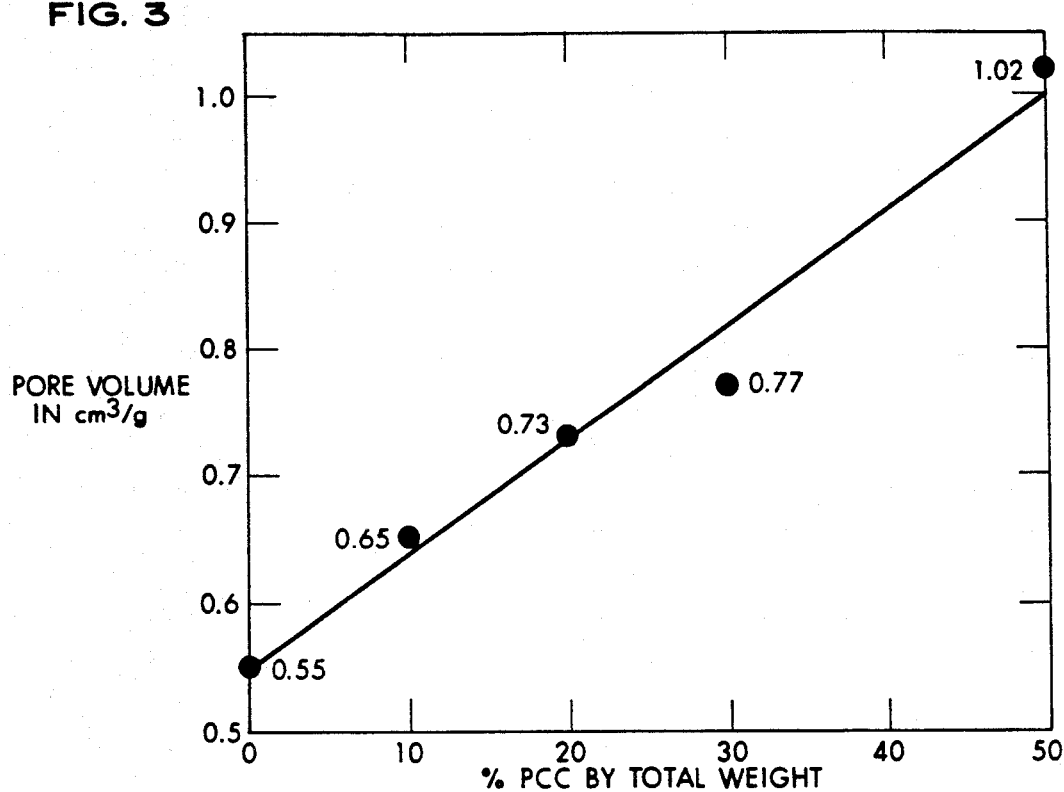
FIG. 3, plots pore volume for a series of kaolin/PCC products which have been aggregated pursuant to the invention.
Figure 4:
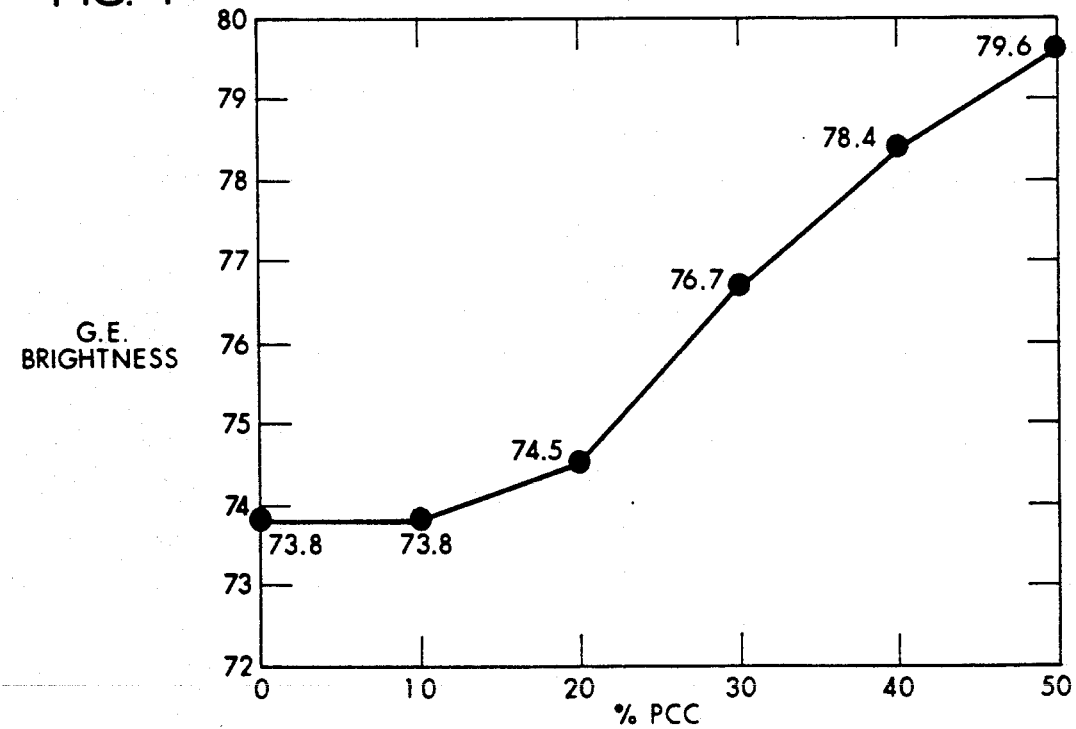
FIG. 4, depicts G.E. brightness for a series of kaolin/PCC products which have been aggregated pursuant to the invention.
Figure 5:
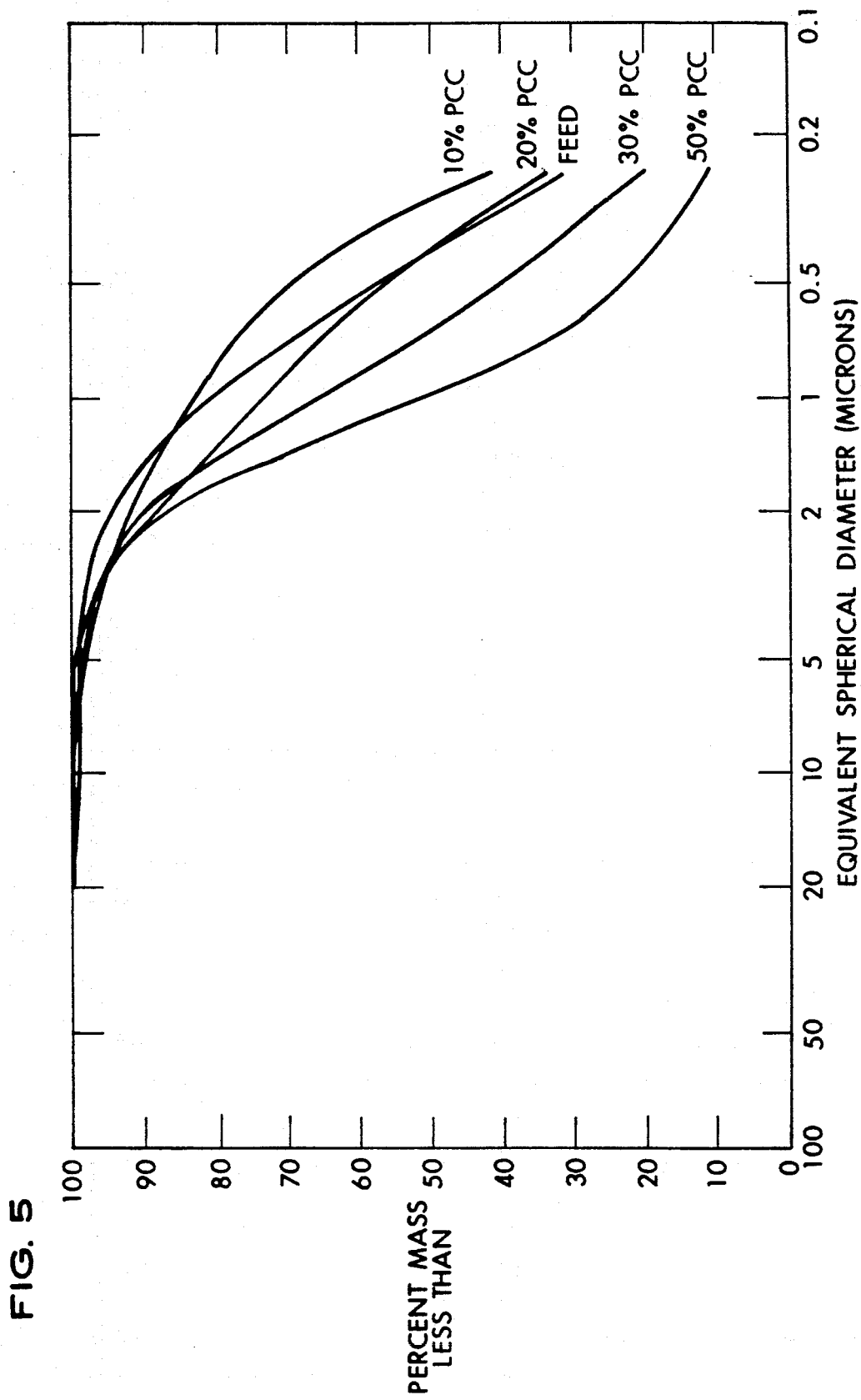
FIG. 5, plots P.S.D. curves for a series of kaolin/PCC products aggregated pursuant to the invention.

A series of experiments were carried out using the procedure described in Example 1, with 72 pounds per ton (of dry kaolin) of 60,000 molecular weight ("MW") polyacrylic acid. The amount of $Ca(OH)_2$ was varied so that the carbonated slurry resulted in varying percentages by weight of precipitated calcium carbonate (PCC) in the aggregated kaolin/PCC products—ranging from 0 to 50%. The aggregated kaolin/PCC products were characterized by pore volume in $cm^3/g$ as measured by mercury porosimetry (FIG. 3), GE brightness (FIG. 4), and particle size distribution (FIG. 5). It can be seen in FIG. 3 that the pore volume of the aggregated material increased almost linearly from 0.55 $cm^3/g$ with no excess PCC to 1.02 $cm^3/g$ with 50% PCC in the aggregate. A similar brightness increase (FIG. 4) was observed with an increase in PCC in the aggregate from 20-50%. The average particle size increased with increasing levels of PCC in the aggregate from 0.4 $\mu m$ in the feed material to 1.0 $\mu m$ when 50% PCC was present in the final aggregated pigment (FIG. 5).

EXAMPLE 3

To a 25% slurry of $TiO_2$ (having characteristics as shown in Table 1) was added 50 pounds per ton (dry $TiO_2$) of 60,000 MW polyacrylic acid and $Ca(OH)_2$ at a dosage rate of 1550 pounds per ton of dry $TiO_2$, the procedure being otherwise similar to that of Example 1. $CO_2$ was then bubbled into the slurry as in Example 1. The resulting aggregated $TiO_2$/PCC pigment showed a change in P.S.D. (compared to the feed $TiO_2$) from 56% below 1 $\mu m$ to 16% below 1 $\mu m$, with an increase in pore volume from 0.33 $cm^3/g$ to 0.66 $cm^3/g$.

TABLE 1

| Sample | P.S.D. ($\mu m$) | | | | | | Pore Volume | Brightness (G.E.) |
|---|---|---|---|---|---|---|---|---|
| | <10 | <5 | <2 | <1 | <½ | <¼ | | |
| $TiO_2$ | 98 | 95 | 83 | 56 | 17 | 1 | 0.33 $cm^3/g$ | 96.4 |
| $TiO_2$/PCC | 96 | 89 | 59 | 16 | 2 | 1 | 0.66 | 96.4 |

EXAMPLE 4

The procedure as described in Example 3 was repeated, using as the feed mineral, Opacimite ®, a fine ground calcium carbonate with properties as described in Table 2, in place of $TiO_2$. (Opacimite ® is a product of the assignee ECC America Inc.) The resulting ground calcium carbonate/precipitated calcium carbonate product showed a pore volume increase from 0.33 to 0.64 $cm^3/g$, with a minimal change in brightness and a corresponding increase in average particle size, as would be expected upon aggregation of the pigment.

TABLE 2

| Sample | P.S.D. ($\mu m$) | | | | | | Pore Volume | Brightness (G.E.) |
|---|---|---|---|---|---|---|---|---|
| | <10 | <5 | <2 | <1 | <½ | <¼ | | |
| Opacimite ® | 99 | 83 | 21 | 5 | 2 | 1 | 0.33 $cm^3/g$ | 93.91 |
| Opacimite ®/PCC | 98 | 70 | 9 | 3 | 1 | 0 | 0.64 | 94.01 |

While the present invention has been particularly set forth in terms of specific embodiments thereof, it will be understood in view of the instant disclosure, that numerous variations upon the invention are now enabled to those skilled in the art, which variations yet reside within the scope of the present teaching Accordingly, the invention is to be broadly construed, and limited only by the scope and spirit of the claims now appended hereto.

What is claimed is:

1. A process for forming chemically aggregated composite bulking pigments for use in paper filling and coating formulations, which comprises:
   a) forming an aqueous slurry at 10 to 30% solids, of a feed material comprising mineral particles selected from one or more members of the group consisting of kaolin, calcium carbonate, titanium dioxide, gypsum, and mica;
   b) adding a high molecular weight carboxyl-containing polymer or copolymer to said slurry to flocculate the said mineral particles;
   c) adding to the flocced slurry an excess of calcium ion to precipitate the calcium salt of the said carboxyl-containing polymer in situ on the mineral flocs, and thereby form aggregates of mineral particles interconnected with said calcium salt and having a bulk, porous, floc structure;
   d) reacting the remaining calcium ion with gaseous carbon dioxide added to said slurry to precipitate calcium carbonate onto the said polymeric carboxyl calcium salt, to thereby form additional light scattering voids and strengthen the connections among the flocced particles of said mineral; and
   e) recovering and drying the resultant composite aggregates as product.

2. A process in accordance with claim 1, wherein said mineral particles comprise a kaolin.

3. A process in accordance with claim 1, wherein said mineral particles comprise titanium dioxide.

4. A process in accordance with claim 1, wherein said mineral particles comprise calcium carbonate.

5. A process in accordance with claim 4, wherein said calcium carbonate is a ground natural calcitic material.

6. A process in accordance with claim 1, wherein said carboxyl-containing polymer or copolymer is selected from one or more members of the group consisting of polyacrylic, polymethacrylic acid, or a copolymer of polyacrylic acid or polymethacrylic acid with one or more acrylic monomers.

7. A process in accordance with claim 1, wherein said carboxyl-containing compound is polyacrylic acid, having a molecular weight of from 60,000 to 1,000,000, and is added to said slurry as from about 25 to 150 lbs/ton of the dry mineral.

8. A process in accordance with claim 1, wherein said calcium ion is added to said slurry as calcium hydroxide.

9. A process in accordance with claim 8, wherein the addition level of said calcium hydroxide provides a pH of from about 11 to 12 in s id slurry.

10. A process for forming a high light scattering aggregated composite kaolin and carbonate pigment, for use in paper filling and coating formulations, which comprises:
   (a) forming an aqueous 10 to 30% solids slurry of a particulate feed kaolin;
   (b) adding a high molecular weight polyacrylic acid to said slurry in quantities to flocculate the kaolin particles;
   (c) adding to the flocced slurry an excess of calcium hydroxide, to bring the pH to basic and precipitate calcium polyacrylate in situ on the kaolin flocs, and thereby form aggregates of kaolin particles interconnected with said calcium polyacrylate and having a bulk, porous, floc structure;
   (d) treating the suspension from step (c) with carbon dioxide to react with the excess calcium ion, thereby precipitating calcium carbonate onto the calcium polyacrylate, to strengthen the connections between the kaolin particles and form additional light-scattering voids; and
   (e) recovering and drying the composite aggregates as product.

11. A process in accordance with claim 10, wherein said polyacrylic acid has a molecular weight in the range of from about 60,000 to 1,000,000, and is added as from about 25 to 150 lbs/ton of dry kaolin.

12. A process in accordance with claim 11, wherein said polyacrylic acid is 10% maleic anhydride modified; said polyacrylic acid having a molecular weight in the range of from 35,000 to 65,000; and being added as 0.2 to 0.3% by weight of dry kaolin.

13. A process in accordance with claim 10, wherein said recovery and drying step is effected by filtering the reaction slurry from the carbonation step, and redispersing and spray drying the filtered material.

14. A process in accordance with claim 10, wherein the proportions of kaolin, calcium hydroxide and carbon dioxide are such that the composite product includes from 10 to 60% by weight calcium carbonate.

* * * * *